Dec. 1, 1936.  P. T. WRIGHT  2,062,853

METHOD OF TREATING COCOANUT SHELL

Filed Oct. 8, 1934

Inventor

P. T. Wright

Patented Dec. 1, 1936

2,062,853

UNITED STATES PATENT OFFICE 2,062,853

METHOD OF TREATING COCOANUT SHELL

Percy Talmage Wright, Clarendon, Va.

Application October 8, 1934, Serial No. 747,479

3 Claims. (Cl. 144—309)

The invention relates to the treatment of cocoanut shell and has as an object the provision of a process for treating the shell in the manufacture of useful and/or ornamental objects of such shell.

It is proposed to manufacture a wide variety of objects from cocoanut shell such as flower holders, vases, ash trays, lamps, book ends, and many other novelties. In such manufacture it is found that if the shell as used in the condition existing when the meat is removed, the object will frequently and in fact almost invariably crack after a period of time of varying duration. It is an object of the invention to provide a process of treating the shell which removes the liability to such cracking.

It is a further object of the invention to provide an object made from portions of shells connected together by a novel securing means.

Further objects of the invention will appear from the following description when read in connection with the accompanying drawing in which:—

Figure 1:
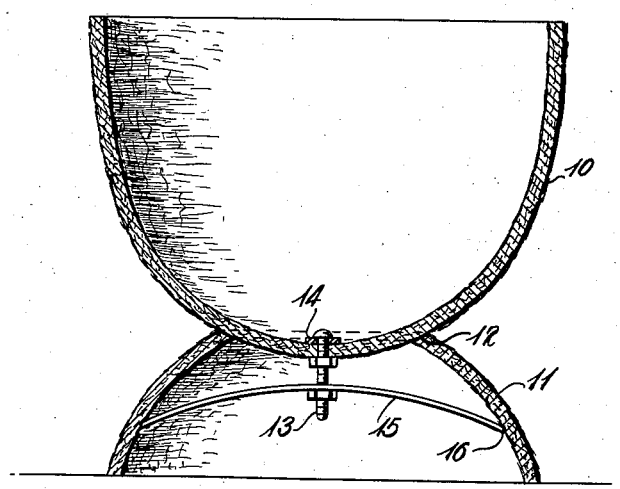
Fig. 1 is a central vertical section of a vase made from cocoanut shell.
Figure 2:
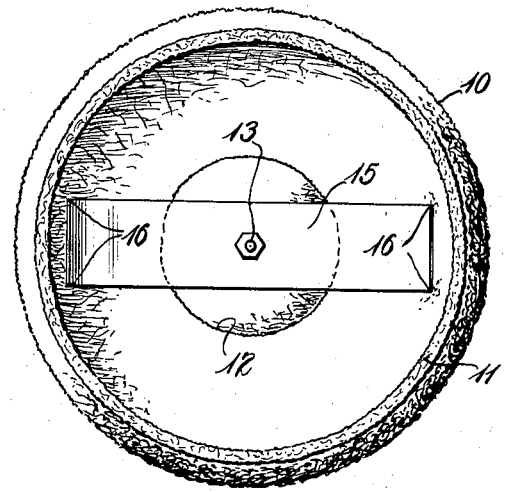
Fig. 2 is a bottom plan view of Fig. 1.

In accordance with the process of the invention, in the utilization of cocoanut shell as a material of manufacture, the shell is kept continuously moist after the removal of the meat until the shell is to be worked to the desired form. This is preferably done by keeping the material immersed in water but it may be accomplished by storing the shell in an atmosphere of a sufficient degree of humidity to prevent any drying out of the shell or by keeping the shell covered by moisture laden material.

When the material is wanted for manufacture, it is taken out of its moist storage and shaped. Should the manufacture of the desired article from the shell consume any period of time of hours, the shell should be again wetted with water from time to time or be allowed to lie in water during interims between different shaping operations thereon.

After shaping and preferably immediately after it has become surface dry, the shell is treated with a pore-sealing material as shellac or any desired varnish or paint.

The best theory at present known to explain the results attained by the process of the invention is that the cracking of the shell when not treated as described is due to too rapid drying of the shell whereby the drying is uneven. Some parts drying more rapidly than other parts set up shrinkage strains which cause the cracking. It is known that no varnish or paint is absolutely proof against passage of moisture.

In accordance with this theory, the application of the coating before the material begins to dry out is an expedient to bring about slow and protracted drying over a considerable period of time. It is therefore within the purview of the invention, instead of immediately varnishing or painting the material, to store the manufactured articles under conditions of gradually decreasing humidity. The latter may be accomplished by storing the shell immediately after removal of the meat of the nut in a hermetically closed wooden container shellacked upon its interior or exterior or in a closed metal container having an extremely small vent opening of a size to permit the shell to become dry throughout its interior structure to usual atmospheric dryness only after a period of weeks.

Because of possible speed of production, the expedient of varnishing or painting the shell before it begins to dry, as described, is preferred. Whatever treatment is adopted it should result in a slow drying of the shell material over a period of weeks by gradually changing the moisture conditions within the body of the material until atmospheric condition is attained.

In accordance with the mechanical feature of the invention, a portion of a shell as 10 is secured to a base portion as 11 by forming an opening in the base portion as at 12, in which opening the portion 10 may seat. The portion 11 may be that removed from the upper edge of the portion 10. A bolt hole is formed in the portion 10 to receive a bolt 13. If the portion 10 is to contain liquid, as water, for use as a vase, a gasket 14 is applied under the head of the bolt.

The bolt 13 is passed through an opening in a resilient member 15 and tightened. The member 15 may be of spring brass, and may be cut roughly to length, the bolt opening drilled and the parts connected.

No special fitting of member 15 is required nor need the ends of this member be accurately squared as the spring of the metal will hold the parts together in any case. The corners 16 of the member 15 will coact with the concave inner surface of the base 11 to firmly hold the parts from relative movement. An extremely cheap and effective structure is thus provided.

Minor changes in the steps of the process or in the mechanical structure of the invention may be made within the scope of the appended claims, without departing from the spirit of the invention.

I claim:

1. The method of treating cocoanut shell as a material of manufacture which comprises removing the meat, and slowly drying the shell over a period of weeks by gradually changing the moisture conditions within the body of the shell until atmospheric condition is attained.

2. The method of treating cocoanut shell in the manufacture of articles therefrom which comprises, removing the meat, storing the shell under moisture saturated condition until wanted for shaping, shaping the shell to form the desired object, and drying the completed object under conditions to delay completion of the drying to atmospheric moisture condition for a period of weeks.

3. The method of treating cocoanut shell in the manufacture of articles therefrom which comprises, removing the meat, exposing the shell under moisture saturated condition until wanted for manufacture, shaping the shell material to form the desired object, and coating the shaped object with a moisture sealing material.

PERCY TALMAGE WRIGHT.